United States Patent [19]
Brock-Fisher et al.

[11] Patent Number: 5,738,098
[45] Date of Patent: Apr. 14, 1998

[54] MULTI-FOCUS ULTRASOUND LENS

[75] Inventors: George A. Brock-Fisher, Andover, Mass.; Gregory G. Vogel, Eliot, Me.

[73] Assignee: Hewlett-Packard Company, Palo Alto, Calif.

[21] Appl. No.: 505,508

[22] Filed: Jul. 21, 1995

[51] Int. Cl.⁶ ........................................... A61B 8/00

[52] U.S. Cl. .................... 128/662.03; 128/663.01; 310/335

[58] Field of Search .............. 128/660.07, 660.08, 128/660.09, 660.1, 661.01, 662.03, 663.01; 73/642, 644; 310/334, 335, 336, 337

[56] References Cited

U.S. PATENT DOCUMENTS

| | | | |
|---|---|---|---|
| 5,349,262 | 9/1994 | Grenon et al. | 128/663.01 |
| 5,402,792 | 4/1995 | Kimura | 128/663.01 |
| 5,477,736 | 12/1995 | Lorraine | 73/642 |

*Primary Examiner*—George Manuel
*Attorney, Agent, or Firm*—Pamela L. Kee

[57] ABSTRACT

The focal length of an acoustic ultrasound transducer is made variable by shaping the focusing element positioned over the transducer. The focusing means consists of a non-uniform focusing element whereby the transducer can be manipulated either electronically or mechanically to optimize the depth of focus for the area of interest.

4 Claims, 4 Drawing Sheets

MULTI-FOCUS ULTRASOUND LENS

This invention is directed toward medical imaging using ultrasound transducers and more specifically, towards improving resolution by changing the elevation depth of focus of a transducer.

BACKGROUND OF THE INVENTION

Echo ultrasound is an established technique in the area of medical imaging. Typically, an ultrasound imaging system has electronics for remote excitation of an ultrasound transducer array or probe to obtain cross-sectional images of the internal organs along a variety of planes.

The transducer array can be a linear array, a curved linear array or a phased array. The basic structure of each array includes a plurality of transducer elements which are arranged adjacent to one another along a surface. The sequence of exciting the transducers differs. In a linear array, the transducers are excited sequentially in a "tractor treading" pattern and form a rectangular image or "window". Typically, a multiplexor is used within the probe to effectuate the sequential excitation of the transducer elements. A phased array system uses a non-sequential excitation of the transducer elements and the image resulting from a phased array transducer is typically pie-shaped. For example, the phased array transducer typically produces an image which fans out from a point, usually the center of the array on the probe. The use of a phased array transducer enables a transthoracic probe to image the heart from between the ribs.

The focal depth of the transducer array can be changed by selectively activating the elements of the array. However, in the case of a one-dimensional array (one row of elements), focusing variation can be achieved only in one plane by selectively timing the excitation of the elements. A two-dimensional array (3 or more rows of elements) can be dynamically focussed by selectively timing in two planes. Such an array is much more complicated, requires many more connections to the additional elements, and is more expensive to manufacture.

Typically, focussing in the plane perpendicular to the plane along the centerlines of the one-dimensional row of elements is provided by a cylindrical lens of material with different acoustic velocity than that of body tissue. As such, this lens is of fixed focal depth which is usually at a distance central to the region of interest and is of uniform radius of curvature.

For better resolution of internal features, a lens radius appropriate to the depth of the feature is desirable.

SUMMARY OF THE INVENTION

The focal length of an acoustic ultrasound transducer is made variable by shaping the focusing element positioned over the transducer. The focusing means consists of a non-uniform focusing element whereby the transducer can be manipulated electronically and/or mechanically to optimize the depth of focus for the area of interest. The focusing element may be a lens for a linear or curved linear transducer with a larger radius of curvature at one end of the ultrasound array than the other. As the area of interest became deeper, the transducer can be slid or rolled such that the optimum radius of curvature is positioned over that location. Since the scan pattern for most linear transducers has considerable width, the area of interest can be studied even though portions of the image adjacent to the area of interest would be less well defined.

For a phased array transducer, the lens radius is made larger as the distance from the center of the array to the ends increases. For shallow depths, only the central elements of the array are needed. These are therefor focussed at a shallower depth by the smaller radius at the center of the lens. For deeper depths, the whole array may be used, thus taking advantage of the larger radii toward the ends of the array for deeper focus.

DETAILED DESCRIPTION OF THE PREFERRED EMBODIMENTS

Figure 1:
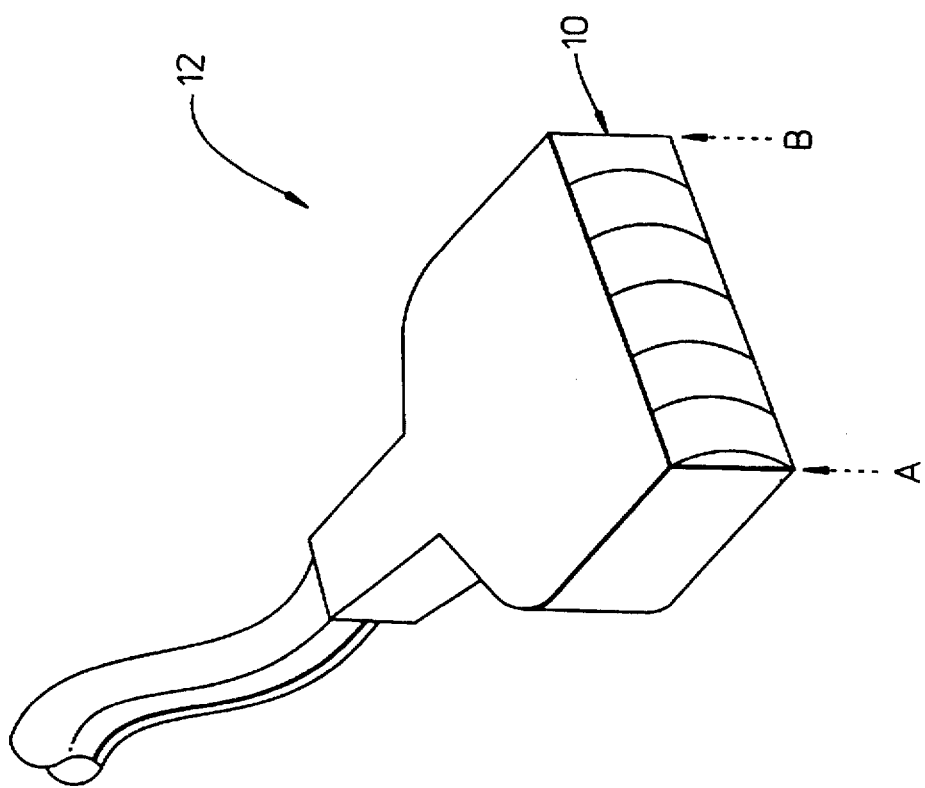
FIG. 1 illustrates an embodiment for the non-uniform focusing element.

FIG. 1 illustrates an embodiment for the non-uniform focusing element. The non-uniform focusing element 10 is a lens that may be positioned over a transducer assembly 12 that is linear or curved linear ultrasound transducer. The lens has a larger radius of curvature at one end of the transducer than the other. As the area of interest becomes deeper, the transducer assembly 12 may be slid or rolled such that the optimum radius of curvature for that depth is positioned over the area of interest. Since the scan pattern for most linear transducers has considerable width, the area of interest can be studied even though portions of the image outside this region will be less well-defined.

The non-uniform focusing element may be fabricated from a castable material, such as silicone rubber, having a slower velocity than body tissue. Velocity in body tissue is on the order of 1500 meters/sec while silicone rubber is about 1000 meters/sec.

Figure 2:
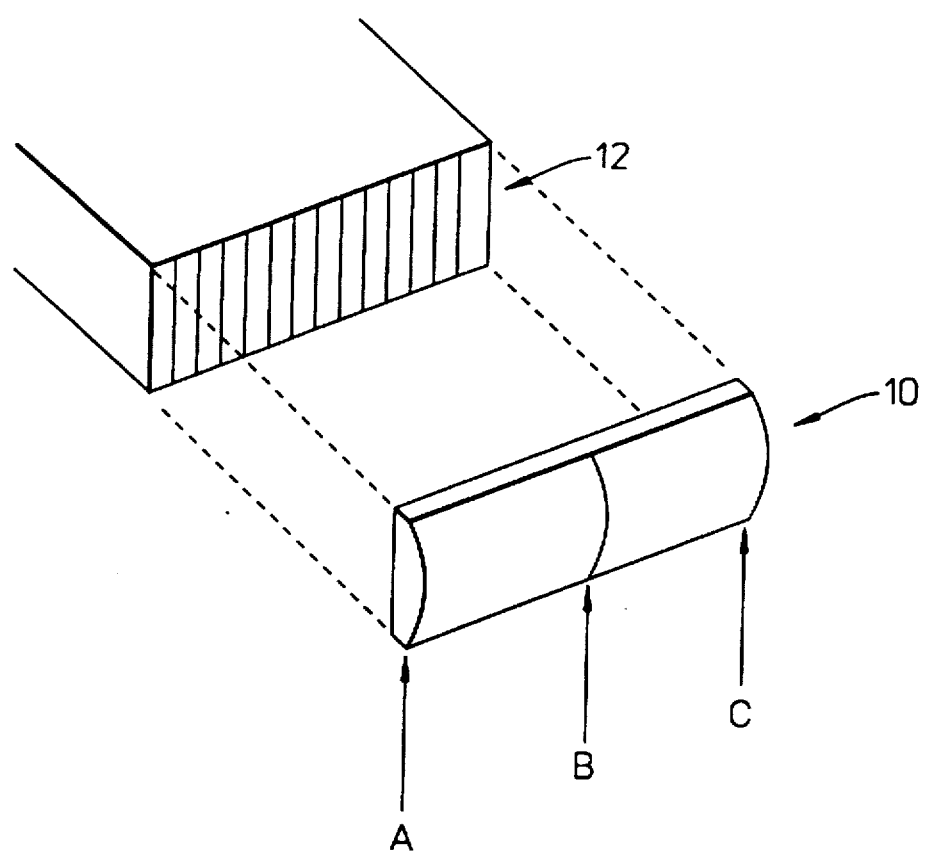
FIG. 2 illustrates a second embodiment for the non-uniform focusing element.

FIG. 2 illustrates a second embodiment for the non-uniform focusing element. The non-uniform focusing element 10 is a lens that may be positioned over a phased array ultrasound transducer 12. The lens has a smaller radius at the center of the array and the radius becomes gradually larger toward the ends. The radius at the ends is optimized for the maximum useful working depth of the transducer. This may be a few centimeters for a neo-natal probe, up to 16 centimeters or so for an adult transducer.

Figure 3C:
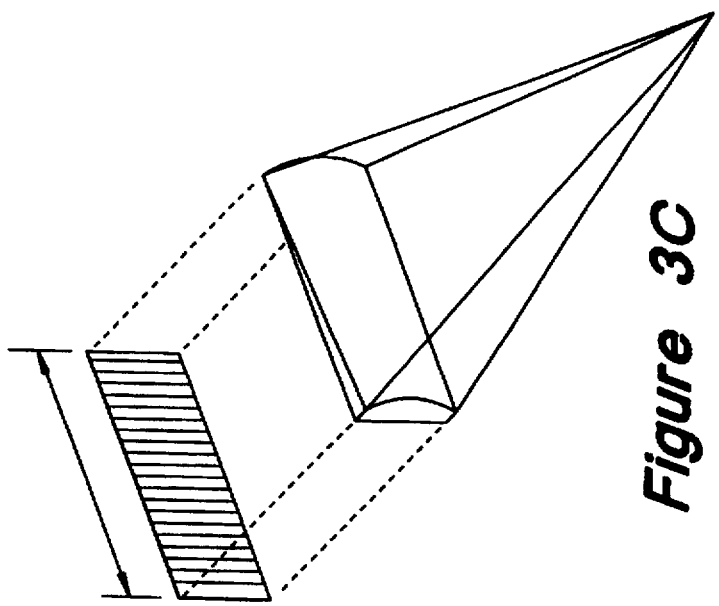
FIGS. 3A-3C illustrates the different focal depths for the second embodiment.
Figure 3B:
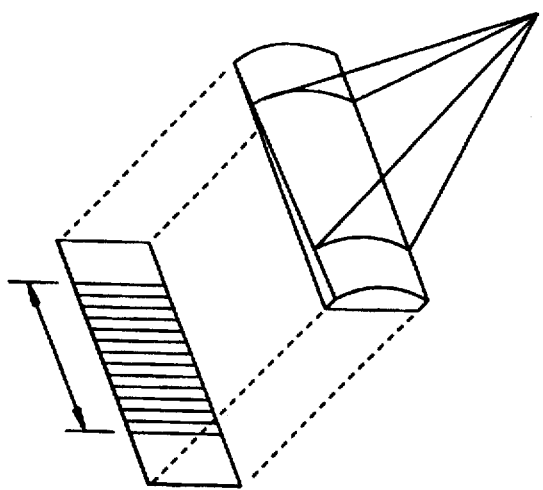
Figure 3A:
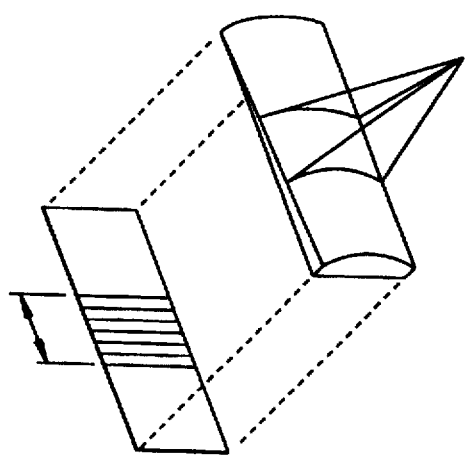

FIGS. 3A-3C illustrates the different focal depths for the second embodiment. In FIG. 3A, for near field focal depths, the center portion is active. For mid-field focal depths, as shown in FIG. 3B, an intermediate range that includes the middle portion of the transducer array is active. The full array and lens are utilized, as illustrated in FIG. 3C for far field depths.

Figure 4:
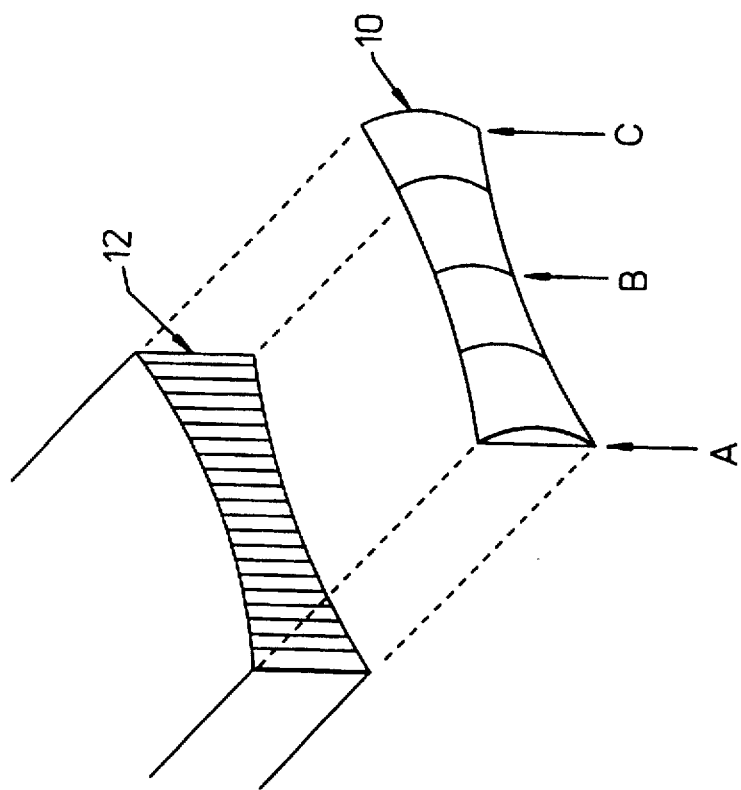
FIG. 4 illustrates a third embodiment for the non-uniform focusing element.

FIG. 4 illustrates a third embodiment. The element lengths of the transducer array are matched to the chord length of the lens as the chord becomes shorter towards the middle. This arrangement tends to match the power available to the depth of interest as more elements are activated for greater depths.

I claim:

1. A transducer assembly having a varying focal depth comprising:

a phased transducer array, having an acoustic face; and a focussing element having a first end and a second end, positioned over the acoustic face, having at least two different radii of curvature, wherein each radii of curvature has a unique focal length;

wherein when a portion of the transducer array is energized, one of the unique focal lengths is selected.

2. A transducer assembly, as defined in claim 1, wherein the first end has a radius of curvature and the second end has a radius of curvature, the radius of curvature of the first end being less than the radius of curvature of the second end.

3. A transducer assembly, as defined in claim 1, the focussing element further including a middle portion, wherein the middle portion has a radius of curvature, wherein the radius of curvature of the first end and the radius of curvature of the second end is greater than the radius of curvature of the middle portion.

4. A transducer assembly, as defined in claim 3, further comprising:

the transducer array having element lengths; and
the focussing element having chord lengths;
wherein the element lengths of the transducer array are matched to the chord lengths of the focussing elements.

* * * * *